(No Model.) 3 Sheets—Sheet 1.

G. H. BENEDICT.
SCALE FOR SURFACE MEASUREMENTS.

No. 397,686. Patented Feb. 12, 1889.

(No Model.) 3 Sheets—Sheet 2.

G. H. BENEDICT.
SCALE FOR SURFACE MEASUREMENTS.

No. 397,686. Patented Feb. 12, 1889.

Witnesses.

Inventor
George H. Benedict
By Jno. G. Elliott
Atty.

(No Model.) 3 Sheets—Sheet 3.

G. H. BENEDICT.
SCALE FOR SURFACE MEASUREMENTS.

No. 397,686. Patented Feb. 12, 1889.

UNITED STATES PATENT OFFICE.

GEORGE H. BENEDICT, OF CHICAGO, ILLINOIS.

SCALE FOR SURFACE MEASUREMENTS.

SPECIFICATION forming part of Letters Patent No. 397,686, dated February 12, 1889.

Application filed May 19, 1888. Serial No. 274,359. (No model.)

*To all whom it may concern:*

Be it known that I, GEORGE H. BENEDICT, a citizen of the United States, and a resident of Chicago, in the county of Cook and State of Illinois, have invented certain new and useful Improvements in Scales for Surface Measurements, of which the following is a specification.

This invention relates to measurement-scales for ascertaining the units of surface contents of square or rectangular bodies.

The object of this invention is to have a measurement-scale which shall in itself indicate, for commercial purposes, the units of surface or the total contents, as the case may be, of angular bodies placed thereon—as, for example, the square inches to be charged for in an electroplate having two or more of its sides forming right angles or the number of ems in set up type matter. I attain this object by means of the scale illustrated in the accompanying drawings, in which—

Figure 1:
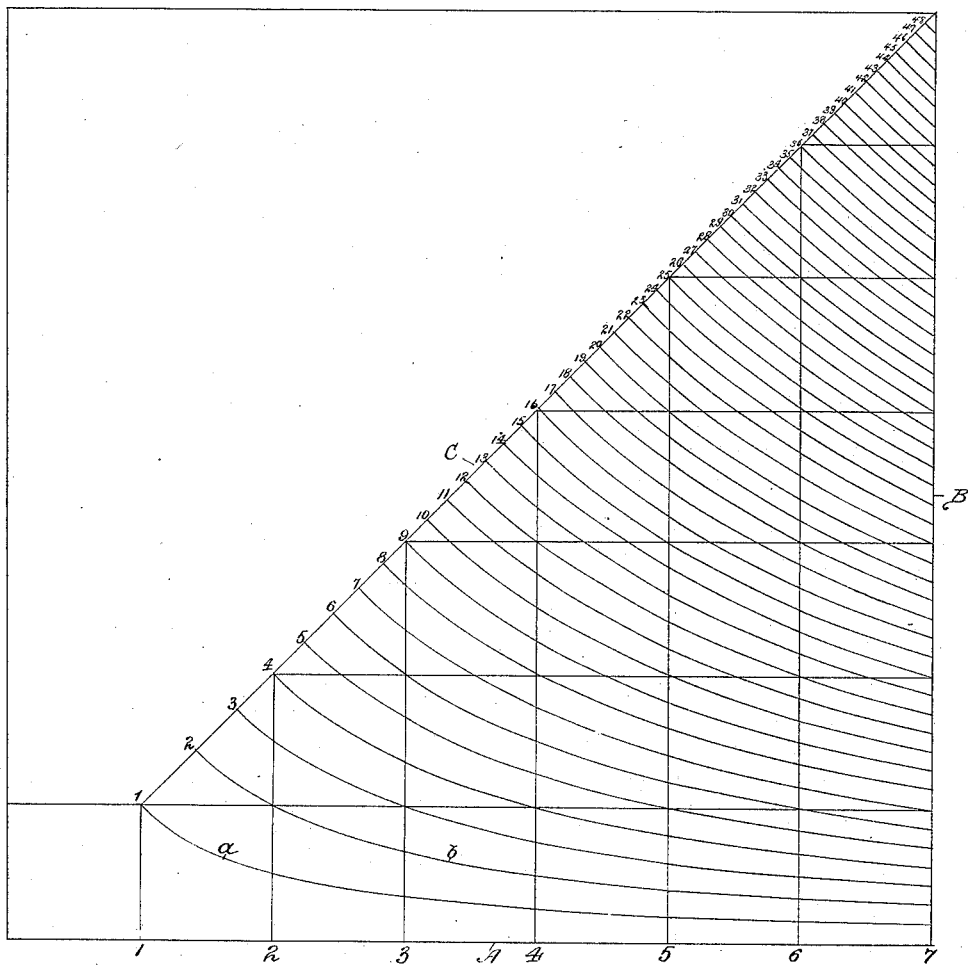
Figure 2:
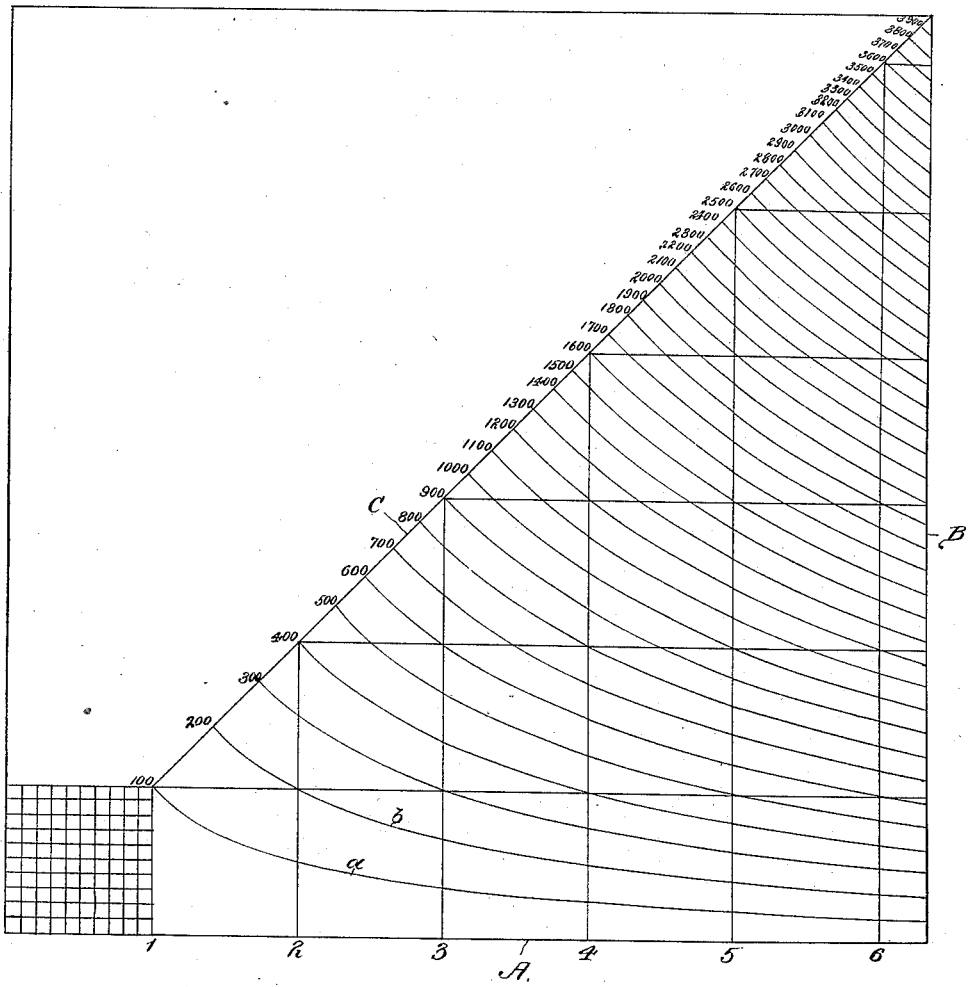
Figure 3:
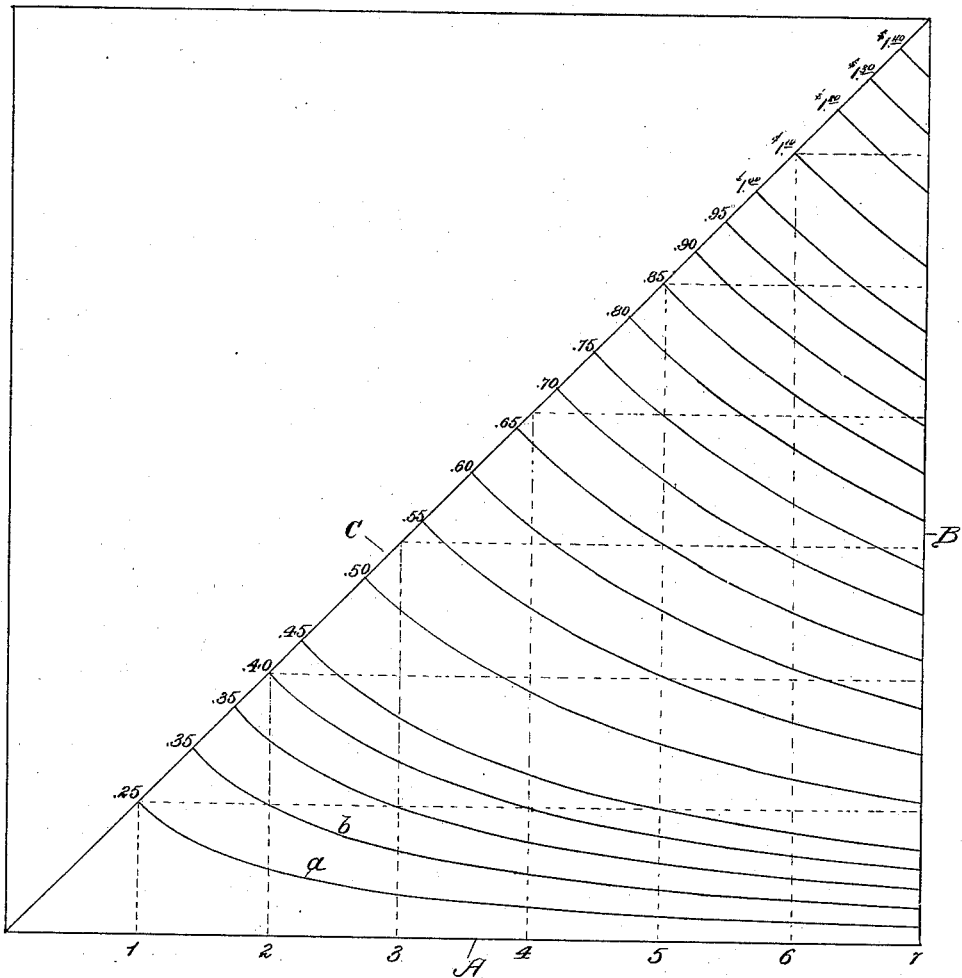

Figure 1 shows a scale especially adapted for ascertaining the superficial area in square inches of square or rectangular bodies; Fig. 2, another scale for ascertaining the number of ems in a form of type, the basis of the measurement being by the hundred ems, and the scale projected on the square of one hundred ems of the size of type to be measured as the unit of measurement; Fig. 3, another scale by which the price of electrotype-plates is ascertained and given, based upon the square inches therein, but which scale is not designed to show the number of square inches.

Similar letters of reference indicate the same parts in the several figures of the drawings.

Either of the scales shown in the drawings may be of any size desired, according to the work which it is intended to perform, but for convenience of description and illustration are herein shown of a size smaller than is commonly employed.

The square-inch scale shown in Fig. 1 is designed for measuring bodies containing not more than forty-nine square inches, and is therefore based upon a square figure measuring seven inches on each side, or forty-nine square inches in all. This figure is first divided by a diagonal line extending from the lower left-hand corner of the figure to the upper right-hand corner thereof, thereby forming a hypotenuse of two right-angled triangles, both of which contain the same square surface, and only one of which need be used in making the measurement, because the multiple of the two sides of any square or rectangular figure gives the total square contents of such figure. The horizontal and vertical lines A B, respectively, of the triangle are then divided into inches, and parallel horizontal and vertical lines drawn from these points to the hypotenuse C, after which the vertical lines 1 2 3 4 5 6 and the line B (marked 7) are subdivided between each pair of horizontal lines into a number of parts corresponding with the number of the line—that is to say, the line 1, from the base A to the hypotenuse C, would be one undivided line; the line 2, from the base to the first horizontal line, would be divided into two parts, and between the first and second horizontal in two more parts; and the line 3, between the base and first horizontal line, into three parts, and between the first and second horizontal lines into three more parts, subdivided as aforesaid into as many parts between each pair of horizontal lines as the number of the lines indicates. Now, beginning at the hypotenuse at the upper end of line 1, which leaves the first square inch undivided, I draw a line, $a$, which is part of a parabolic curve, through the first subdivision above the base-line A of each vertical line, entirely across the scale to the right-hand line 7, thereby crossing line 2 a half-inch above the base-line, the line 3 one-third of an inch above the base-line, the line 4 one-fourth of an inch above the base-line, the line 5 one-fifth of an inch above the base-line, and so on to the line 7. A second curve, $b$, is then drawn from the hypotenuse to the line 7, intersecting each vertical line at the second subdivision above the base, so as to indicate two half-inches on line 2, two third-inches on line 3, two fourth-inches on line 4, two fifth-inches on line 5, and so on to the line 7, this same process of lining being continued throughout all of the squares, each curved line progressing upon the vertical line one subdivision thereof in each square until the whole surface is covered. These curved lines *a b,* &c., upon the measuring-scale in practice would be numbered in consecutive order 1, 2, 3, 4, and up, because it is by these lines that the number of square inches in the surface is indicated—that is to say, any body the upper right-hand corner of which rests upon the line 18, for instance, while the lower left-hand corner thereof is at the lower left-hand corner of the scale, indicates that there are eighteen square inches in the surface; or, if the upper right-hand corner touches the curved line 27, then it indicates that there are twenty-seven square inches in the surface. In order to prove the accuracy of this measurement and to show the underlying principle of the scale, we will suppose that a rectangular body, when laid on the scale, strikes the curved line 8, and the shape of the body is such that the right or vertical side thereof rests upon the vertical line 5. Now, we know that, measuring by inches from the left-hand corner, there are five whole square inches, and that the body, in order to touch the 8-line, must extend up into the second horizontal series of square inches three-fifths of an inch to reach the eighth division of the fifth line from the base, and as these three fifths extend five inches from right to left they must cover three fifths, or fifteen fifths, which equals three whole ones, which, added to the five square inches in the first tier of squares, makes the eight square inches indicated by the line. In other words, in a measurement of this size of body there are ten square inches involved, of which forty fifths are covered by the body, while the remaining ten fifths—that is, the remaining two fifths of each of the five upper squares—are left uncovered—that is to say, all of the squares of course contain five-fifths of an inch, when we draw horizontal lines from the divisions of one fifth on the fifth line; hence five whole squares, containing twenty-five fifths, and five parts of the squares, each containing three fifths, making fifteen fifths, added to the twenty-five fifths of the whole squares, would make forty fifths in all, or eight whole inches.

While the measurements ascertained by the scale formed in the manner described are sufficiently accurate for all commercial purposes, they are not mathematically correct, although they could be made so, provided the parabolic curve upon which the measurements are made, which is commonly known as the "line of multiplication," is projected with mathematical accuracy, and, indeed, the curved lines might be substituted by angular lines connecting the various subdivisions in the same way as the curved lines, only being straight between the different subdivisions instead of curved, as shown, for even with such a line the measurement would be correct enough for commercial purposes.

It is obvious that the units of measure, instead of being a square inch, might be a square foot, yard, acre, mile, or any other unit of measure, according to the calculations desired to be made by the scale, and this may be done without altering the scale by assuming that the square inches of the scale represent square feet, yards, acres, or any other unit of measurement.

As a further illustration of the various uses to which my device can be put, I have shown in Fig. 2 a scale for measuring the number of ems in a form of brevier type, the unit of measurement in this case being the square of one hundred brevier ems or one hundred type, which is sufficiently accurate for commercial purposes, because type is usually counted by the hundred. This unit of measurement—that is, the square of one hundred brevier ems—is treated, as shown, in exactly the same way as the square-inch scale, the triangle being ascertained, first, by making a square of any number of units, then dividing it by the hypotenuse, after which the subdivisions on the vertical lines are made and connected by curved lines, as in the square-inch scale, the only difference between the scales being the difference in the area of the unit of measurement and the numbering of the curved or indicating lines, which in this case will be numbered 100, 200, 300, 400, and so on, indicating the number of type in a given form, instead of the number of units of measure, as in the inch-scale.

In practice, of course, there would necessarily have to be a scale for measuring each size of type, because the ems of different sizes would make a different unit of measurement. Such type-measuring scales would be of especial value to printers, not only for determining the number of type set up in a certain form, but would enable the printer to make an estimate of nearly the exact number of type of any kind which it would take to form pages of a proposed book, when he knew the size of the book, and could therefore calculate to a nicety the cost of composition, instead of arriving at his conclusion by a rough guess, which is more apt to be wrong than right.

Another form of scale evolved from the square-inch scale is shown in Fig. 3, this scale being intended for the use of electrotypers, engravers, and others who make charges for work according to the superficial area or square-inch contents thereof at so much per square inch, the only difference between this scale and the square-inch scale being that the curved lines of measurement, instead of being numbered, have the price-mark applied thereto, as shown, in which case the square-inch division-lines may be omitted. The price, of course, on each line is based upon the square-inch contents of a plate which touches that line when measured in the manner hereinbefore described. For instance, if the work is to be charged for at the rate of twenty cents a square inch, then the curved line which indicated seven square inches would be marked $1.40, and so on for each of the other lines, the number of square inches indicated by the line being multiplied by the price per square inch, and as the price of the different classes of work varies so must the price-mark on the scale vary according to the work it is intended to perform.

Having described my invention, what I claim, and desire to secure by Letters Patent, is—

1. A scale for ascertaining the number of units of square measure in a square or rectangular surface containing a multiplicity of such units, the same consisting of a series of curved or angular lines projected in successive order upon a diagram divided by vertical and horizontal lines into a number of the square units to be ascertained, the vertical lines bounding one side of each square being subdivided between each pair of horizontal lines into as many parts as the numbered position of the line from the measuring-corner of the scale indicates, and each curved or angular line intersecting all the vertical lines at the same point of subdivision in said lines, substantially as described.

2. A scale for ascertaining the number of units of measure in a square or rectangular surface containing a multiplicity of such units, the same consisting of a diagram squared by one of such units, one side of each of which squares is divided into a successive series of parts, beginning with unity and progressing in consecutive order, and having curved lines projected across said diagram, intersecting each series of divisions in successive or progressive order, substantially as described.

GEORGE H. BENEDICT.

Witnesses:
ALBERT M. BENNETT,
WILL R. OMOHUNDRO.